United States Patent [19]

Corbic

[11] 4,228,633
[45] Oct. 21, 1980

[54] METHOD FOR MANUFACTURING, FILLING AND CLOSING A RECEPTACLE MADE OF THERMOPLASTIC MATERIAL

[75] Inventor: Yves J. Corbic, Chatou, France

[73] Assignee: Gatrun Anstalt, Vaduz, Liechtenstein

[21] Appl. No.: 886,093

[22] Filed: Mar. 13, 1978

Related U.S. Application Data

[63] Continuation-in-part of Ser. No. 704,730, Jul. 12, 1976, Pat. No. 4,131,211.

[30] Foreign Application Priority Data

Mar. 15, 1976 [FR] France .............................. 77 07706

[51] Int. Cl.³ ............................................. B65B 61/18
[52] U.S. Cl. ........................................ 53/412; 53/471
[58] Field of Search ............... 53/412, 453, 471, 473, 53/485; 93/36 DA; 264/139, 154, 155, 268; 156/69, 251; 215/2, 305, 232; 206/628, 631, 633; 220/270, 359

[56] References Cited

U.S. PATENT DOCUMENTS

| 1,083,263 | 12/1913 | Van Wormer | 93/36 DA |
| 2,026,477 | 12/1935 | Lescher | 206/628 |
| 2,226,049 | 12/1940 | Carley | 93/36 DA |
| 2,857,067 | 10/1958 | Lehmans | 215/2 |
| 3,145,630 | 8/1964 | Moore | 93/36 DA |
| 3,251,515 | 5/1966 | Henchert et al. | 220/270 |
| 3,273,302 | 9/1966 | Walter | 53/412 |
| 3,532,785 | 10/1970 | Johnson et al. | 264/155 |
| 3,884,382 | 5/1975 | Ball | 53/412 X |
| 3,932,575 | 1/1976 | Andersson | 264/154 |
| 4,029,033 | 6/1977 | Kepwin et al. | 220/359 |
| 4,104,349 | 8/1978 | Hillgenberg | 264/155 |

FOREIGN PATENT DOCUMENTS

| 1786288 | 4/1972 | Fed. Rep. of Germany. |
| 1164802 | 10/1958 | France. |
| 831159 | 3/1960 | United Kingdom | 264/268 |

*Primary Examiner*—John Sipos
*Attorney, Agent, or Firm*—Irvin A. Lavine

[57] ABSTRACT

The method comprises the forming in one piece of the side wall and an end wall of the receptacle, the sealing of a covering foil or cap on the outer face of the end wall, the forming of a slot at least partially closed on itself by partially melting thermoplastic material of the end wall with at least a zone of the end wall surrounding the slot and a part of the end wall surrounded by the slot being hermetically fast with the covering foil or cap, the filling of the receptacle through an opening opposite the end wall, and the closing of said filling opening by a separate bottom, whereby an extraction opening delimited by the slot is made by pulling the covering foil or cap.

13 Claims, 21 Drawing Figures

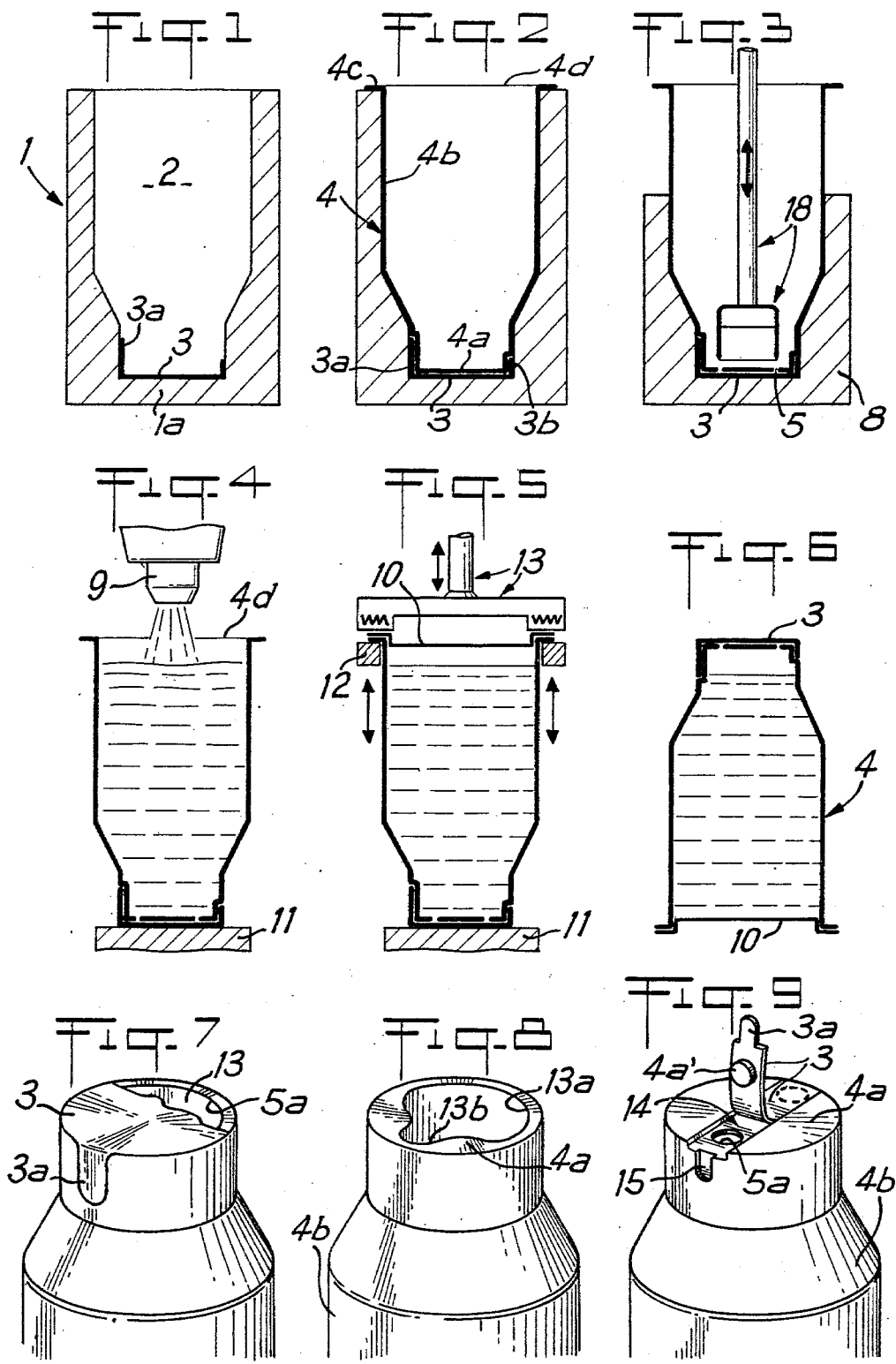

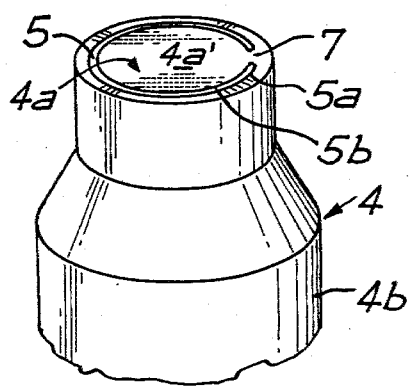
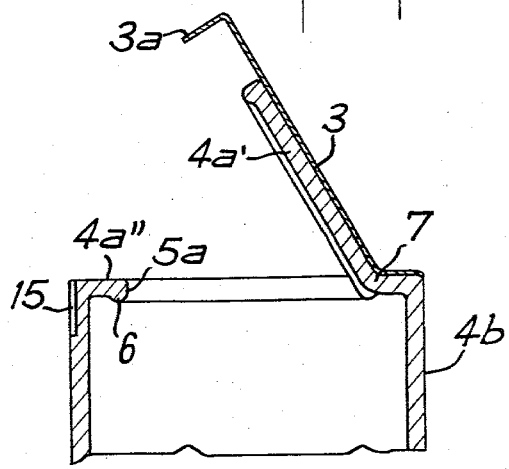
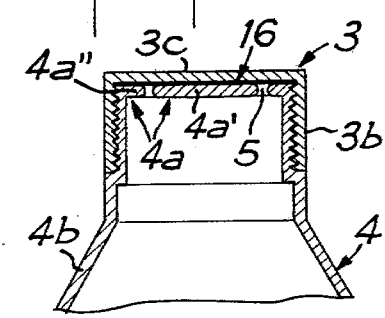
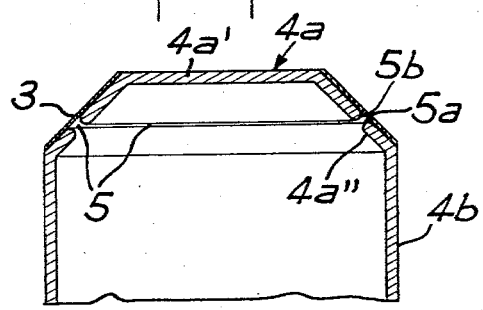

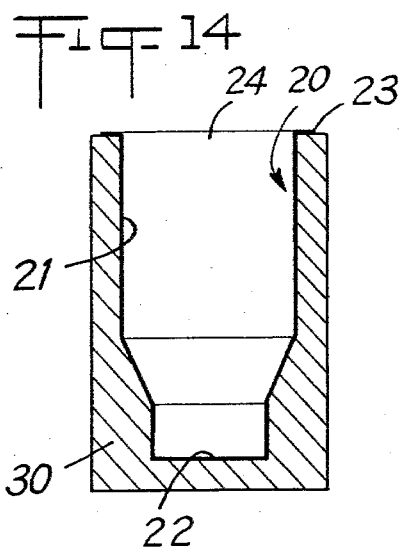
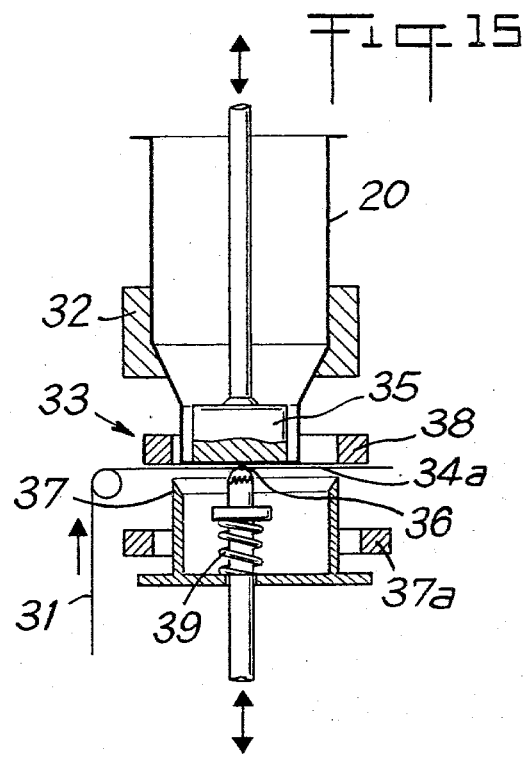
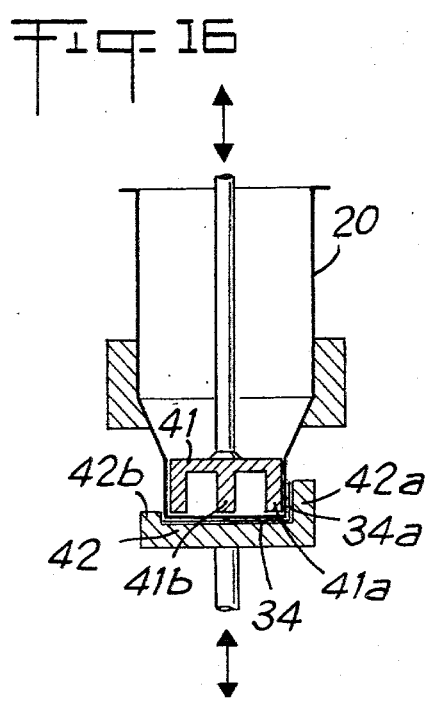
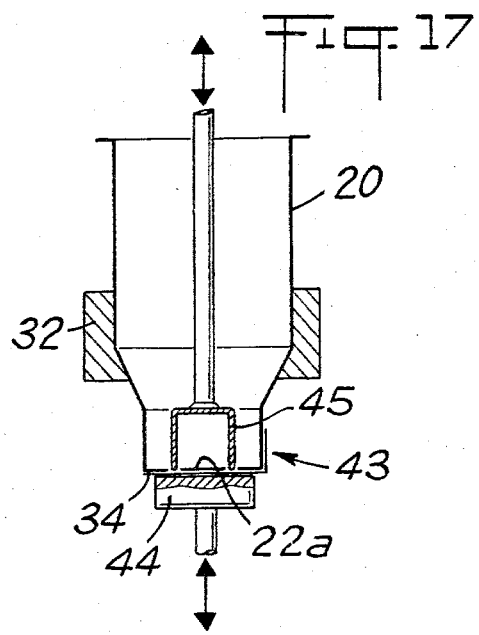

METHOD FOR MANUFACTURING, FILLING AND CLOSING A RECEPTACLE MADE OF THERMOPLASTIC MATERIAL

The present application is a continuation-in-part application based on my copending application Ser. No. 704,730 filed on July 12, 1976, now U.S. Pat. No. 4,131,211.

The present invention relates to a method for manufacturing, filling and closing a receptacle such as a beaker, bottle or the like made of thermoplastic material and comprising a side wall, an end wall integral with said side wall, a separate bottom hermetically closing a filling opening located opposite the end wall and means for forming an extraction opening through said end wall.

A receptacle such as defined hereinbefore is described in U.S. Pat. No. 2,857,067. In this case, the end wall is provided with a groove closed on itself and constituting a line of least resistance along which an extraction opening may be cut with an appropriate object.

The drawback of these receptacles is that they require a sharp object to open them and that the contents of the receptacle sometimes squirt out when the end wall is cut.

It is also known by French Pat. No. 1,196,104 to firstly make the side wall of the receptacle so as to leave on the end wall side an annular portion defining the end opening, to close said opening by a lid and to provide the other end of said wall with a bottom after having previously filled said receptacle.

It is also generally known to cover the extraction opening of a receptacle with a metal sheet or disc, e.g. aluminium foil, provided with a layer of glue, preferably thermo-adhesive, and to weld or crimp said foil on the edge of the extraction opening (cf. for example French Pat. No. 1 273 581).

It has been ascertained that the seal of a metal foil on the edge of the extraction opening is not very convenient especially when said edge is inside the periphery defined by the corresponding end of the side wall of the receptacle. This drawback is further increased when the side wall and the end wall are made by heat-forming and when the subsequent extraction opening is cut out from said end wall by suitable cutting, shearing or stamping means.

In fact, in this case, the thickness of the end wall is substantially less than that of the side wall, with the result that the extraction opening made in said end wall is delimited by a very sharp edge which makes the use of these receptacles fairly problematic. In addition, in the case of a thin edge located inside the periphery of the corresponding end of the side wall of the receptacle, the seal to be made between said edge and the metal foil by cold-gluing or by heat-sealing is often defective, with the result that the contents of the receptacle is in direct contact with the ambient air and may even escape inopportunely. Upon sealing of the metal foil on the already thermo-formed edge of the receptacle, the heat from sealing releases the internal tensions of the thermoplastic material which are due to the thermo-forming and to the sharp cooling of the thermoplastic material when it comes into contact with the mould, with the result that the edge retracts and cracks in the sealing zone.

The object of the invention is to provide a method for obtaining a receptacle having none of these drawbacks.

The object of the invention is more particularly to provide a method for obtaining a receptacle having at least one extraction opening without a shape edge and being provided with a covering foil or cap hermetically closing the receptacle before it is used.

This object is attained, according to the invention by a method comprising:

forming in one piece a side wall and an end wall of said receptacle by deformation of a thermoplastic material in a mould;

sealing a covering foil or cap on at least a portion of the outer face of said end wall, said covering foil or cap being provided with a layer of adhesive material on its face turned towards the end wall;

forming in said end wall at least one curved or polygonal slot at least partially closed on itself by partially melting the thermoplastic material from the inner face of said end wall and through the entire thickness of said end wall, at least a zone of said end wall completely surrounding said slot and a part of said end wall surrounded by said slot being hermetically fast with said covering foil or cap;

filling said receptacle through a filling opening opposite said end wall provided with said at least one slot; and hermetically closing said filling opening by a separate bottom, whereby an extraction opening can be made through said end wall by removing said covering foil and pulling thereby said part of said end wall surrounded by said at least one slot.

As the end wall of the formed receptacle is already fast with the metal covering foil or cap, the marginal zone defining the slot does not undergo any deformation during its production by melting of the thermoplastic material; furthermore, the excess heat with respect to that necessary for melting the slot can soften the thermoplastic material only in the marginal zone of the slot as it is rapidly distributed and dissipated in the metal covering foil or cap.

The covering foil or cap may be deposited on the mould bottom prior the forming of the receptacle in said mould, the sealing of the covering foil or cap on the end wall of the receptacle being performed during forming of the thermoplastic material in the mould.

According to another and preferred embodiment of the invention, the method comprises the steps of:

bringing a section of a strip coated with a layer of adhesive opposite the outer face of said end wall after forming of said side and end walls of the receptacle;

making at least one point of attachment between said strip and the outer face of said end wall;

cutting out said covering foil from said strip; and sealing said covering foil and said end wall.

The invention will be more readily understood on reading the following description with reference to the accompanying drawings, in which:

FIGS. 1 to 5 are vertical axial sections through a receptacle during the different stages of its manufacture and filling by a method according to a first embodiment of the invention, FIG. 6 is a vertical axial section through a receptacle filled and closed obtained by a method according to the invention;

FIGS. 7 to 10 are views in perspective of different embodiments of the extraction end of the receptacle obtained by a method according to the invention; and FIGS. 11 to 13 are axial sections through further embodiments of the extraction end of receptacles obtained by a method according to the invention.

FIGS. 14 to 19 are vertical axial sections through a receptacle during the different stages of its manufacture and filling effected according to a second and preferred embodiment of the method of the invention.

Figure 18:
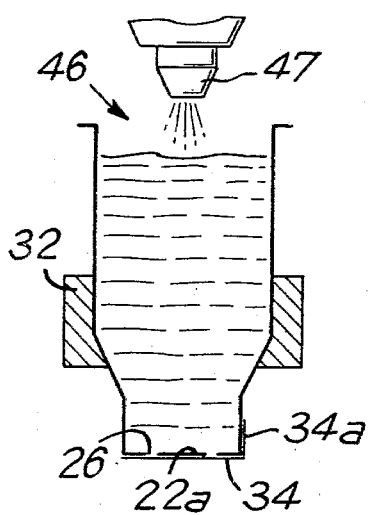

Referring now to the drawings, FIGS. 1 to 6 show a mould 1 having a cavity 2 of suitable form, for example in the form of a cylindrical, truncated or pyramidal bottle, beaker or the like in which is disposed, in the bottom zone and preferably on the very bottom 1a of said mould, a metal covering foil or cap 3, preferably made of aluminium which, on the face opposite the bottom 1a of the mould 1 and intended to adhere intimately to the end wall of the receptacle, is provided with a layer of adhesive which glues hot or cold.

This covering foil 3 is in the form of a small cap whose edge is raised, but it may also be almost flat as shown in FIG. 7. The covering foil 3 comprises a tongue 3a which is not covered with any layer of glue or adhesive.

After having deposited the foil 3 in the mould 1, the end wall 4a and the side wall 4b of the receptacle 4 is moulded above said foil 3, for example by a well known method of thermo-forming from a thermoplastic band or sheet, such as for example described in French Pat. No. 1 134 142 or German Pat. No. 1 165 241. The upper part of the side wall 4b terminates in an outwardly directed annular edge 4c surrounding an opening 4d for filling. Of course, a known method of injection moulding may also be carried out to make the receptacle 4. When the end wall 4a is moulded, it comes into contact, in the hot state, with the adhesive layer which is preferably heat-sealing, provided on the inner face of the covering foil 3 with the exception of the portion forming tongue 3a which, moreover, automatically fits into the material of the side wall 4b in the same way as the raised edge 3b of the foil 3 if there is one (cf. for example FIG. 2). Under the effect of the uniform pressure prevailing inside the receptacle 4 and more precisely, on the side of the inner face of the end wall 4a and of the side wall 4b, and under the effect of the heat of the thermoplastic material coming in contact with said covering foil 3, the layer of adhesive establishes, after the whole has cooled down, a sealed, sufficiently solid bond between said foil 3 and said end wall 4a.

Once this sealed bond is established, a slot 5 of curved or polygonal form, closed at least partially on itself (cf. for example FIG. 10) is made in the end wall 4a, and more generally speaking in the wall covered by the covering foil 3. This slot 5 is made in the end wall 4a by partially melting the thermoplastic material composing same with the aid of a heated electrode 18 of suitable form, for example annular and arranged so as to be able to penetrate into the mould 1 as far as the bottom thereof. As the covering foil 3 is made of a non-fusible material, for example paper and preferably metal, particularly aluminium, the heated electrode 18 has no effect on said foil 3 and is stopped thereby since said latter rests directly on the bottom 1a or another portion of the mould 1 made of an incompressible material. When the termoplastic material is partly melted at the moment of making the slot 5, this material escapes laterally, forming a sort of flange 6 or rounded section (cf. in particular FIG. 11) on each edge defining the slot 5. The shape of the slot 5 is generally round, oval, polygonal, etc.. and closes at least partially on itself (cf. FIG. 10). When the slot 5 does not close entirely on itself, it is important that the joining part 7 which is integral with the end wall 4a and which connects the part defined by the outer edge 5a of said slot 5 to the part delimited by the inner edge 5b of this slot, extend along a straight line or be at least relatively short (cf. FIGS. 10 and 11). The slot 5 may also be entirely closed on itself (cf. FIGS. 1 to 9, 12 and 13) with the result that the part 4a' of the end wall 4a, delimited by the inner edge 5b of the slot, is entirely separated from part 4a'' of the end wall 4a, said part 4a'' located outside the edge 5a of the slot 5.

The part 4a' of the end wall 4a, part 4a' being located inside the slot 5 and entirely separated thereby from the part 4a'' located outside the said slot 5, is maintained in place by the covering foil 3 which is hermetically glued or welded both on the outer part 4a'' and on the inner part 4a' of the end wall 4a. For making the slot 5, the receptacle is not necessarily housed in the mould 1 having served for forming said receptacle 4. In fact, for making the slot 5, it is sufficient if that receptacle part, i.e. the end wall 4a, which is provided with the covering foil 3 is supported by a support 8 which may possibly also hold the receptacle 4 laterally, as shown in FIG. 3.

After the slot 5 has been made, the receptacle 4 is transported to a filling station where it is filled from one or more nozzles 9 through the filling opening 4d (FIG. 4) and said receptacle 4 is then closed, for example in a sealing station where it is provided with a sectioned or flat, separate bottom 10 hermetically welded on the annular edge 4c on the receptacle 4 (cf. FIG. 5). Whilst the receptacle 4 is being filled and sealed, it rests on a support plate 11. In the sealing station, a support ring 12 and electrode 13, which are vertically movable and capable of tightening therebetween the edges of the receptacle 4 and the separate bottom, 10, serve to hermetically close, in known manner, the receptacle 4 which is then placed in its normal position in which the covering foil 3 is located above the separate bottom 10 (FIG. 6).

FIG. 7 shows that the outer edge 5a of the slot constitutes at the same time the delimitation of the extraction opening 13 of the receptacle once the covering foil 3 has been removed. This extraction opening may also be shaped so as to present a semi-circular part 13a followed by an oblong part 13b forming a sort of pouring spout after the covering foil 3 has been removed (cf. FIG. 8).

It is not necessary for the covering foil 3 to cover the whole of the end wall 4a. It may for example take the form of a strip (cf. FIG. 9) which covers only a part of the end wall 4a provided in the covered zone with two slots of which the outer edges 5a constitute the extraction opening after the removal of the covering foil 3 on which adheres the part of the end wall 4a' located inside the slot 5, i.e. inside the outer edge 5a.

Of course, when the mould 1 has a flat bottom and the covering foil 3 does not cover the whole of the end wall 4a, said foil 3 fits into said wall 4a (FIG. 9) which then presents a shallow recess 14, after said foil 3 has been removed. Similarly, the tongue 3a of the covering foil 3 fits into the adjacent part of the side wall 4b forming a recess 15 therein, but with the difference with respect to the foil 3, that said tongue 3a does not adhere to the side wall 4b of the receptacle.

It is easily understood that the end wall 4a may be provided with a plurality of extraction openings in the zone of the covering foil 3. This may be advantageous when the receptacle 4 contains a powder or granular product or pieces in bulk, etc. In this case, it may also be advantageous to provide the inner face of the covering foil 3 with a layer of glue with permanent adhesive power, with the result that, after the receptacle has been used, the covering foil 3 may be reglued on the end wall 4a.

In the case of the slot 5 not being entirely closed on itself (FIGS. 10 and 11), the part 4a' of the end wall 4a serves as permanently attached partial cover, the tongue 3a and cover foil 3 fast therewith facilitating its pivoting at the level of the joining part 7.

A cylindrical cap may also be used as covering foil 3, of which the cylindrical side wall 3b is threaded and of which the flat part 3c covers the end wall 4a of the receptacle 4. In this case, there is provided on the face of the cap 3 opposite the end wall 4a, a layer of highly viscous glue 16 which is thixotropic in behaviour, has a low shear strength and which, in addition, presents a high volumic stability. In this way, when the threaded cap 3 is rotated with respect to the side wall 4b of the receptacle, the sealed bond between the flat part 3c of said cap 3 and the outer part 4a" of the end wall 4a, said outer part 4a" surrounding the slot 5, is broken.

The end wall 4a of the receptacle is not necessarily flat. It may also be convex, spherical, pyramidal, truncated, etc. or may be a combination of a flat part with a non-flat part. FIG. 13 shows a part of a receptacle, which comprises in particular an end wall 4a composed of a flat part and of a truncated part in which the slot 5 is made. On its outer face, the truncated part of the end wall 4a adheres intimately to the covering foil 3 which also hermetically covers the slot 5 and is shaped so as to be able to be adapted to the truncated form of the end wall.

FIGS. 14–19 illustrate a preferred embodiment of the method according to the invention.

Referring now the the drawings, the first manufacturing operation consists in moulding the side wall 21 and the end wall 22 of a receptacle 20 in one piece. This is carried out (FIG. 14) in a mould 30, the cavity of which is of suitable shape, for example in the form of an upturned bottle or beaker, which is cylindrical, truncated or pyramidal, by using a well known method of heat-forming from a strip or sheet of thermoplastic material. Opposite the end wall 22, the side wall 21 terminates in an annular flange 23 which surrounds the filling opening 24 of the receptacle. By way of variant, the walls 21 and 22 of the receptacle may be made by injection moulding.

The receptacle 20 is removed from the mould 30 then, supported by an annular support 32 which leaves its lower part free, is brought to a station 33 for cutting out and positioning a covering foil 34 (FIG. 15). This station comprises an upper bearing element 35 which is movable vertically and adapted to come, inside the receptacle, into contact with the inner face of the end wall 22, and a heating electrode 36 in the form of a rod vertically movable beneath the bearing element 35. A vertically movable cut-out punch 37 and a counter-punch 38 cooperating with the punch 37 are further provided to cut out the covering foil 34 from a covering strip 31 drawn from a storage roll (not shown) and brought opposite the end wall 22 in the immediate vicinity of the outer face of this wall. The covering strip 31 is made of non-fusible material, for example paper or preferably metal, particularly aluminium. It is provided on its face turned towards the end wall 22 with a thin layer of thermoadhesive material.

The receptacle 20 having arrived at station 33, the upper bearing element 35 and the heating electrode 36 are moved towards each other to compress the wall 22 and strip 31 therebetween. Under the effect of the pressure and the heat, the strip 31 adheres to the wall 22. As the prupose of this adhesion is only to establish a connection which is just sufficient to hold until the covering foil is definitively fixed to the wall 22, it may simply be at spots, the heating electrode being in the form of a finger, and may be effected solely in the central zone of the covering foil.

Figure 20:
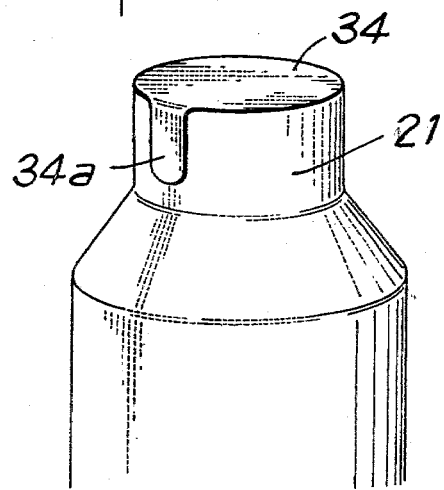
FIG. 20 is a partial perspective view on a larger scale of the extraction end of the receptacle whose manufacture and filling are illustrated in FIGS. 14 to 19.
Figure 21:
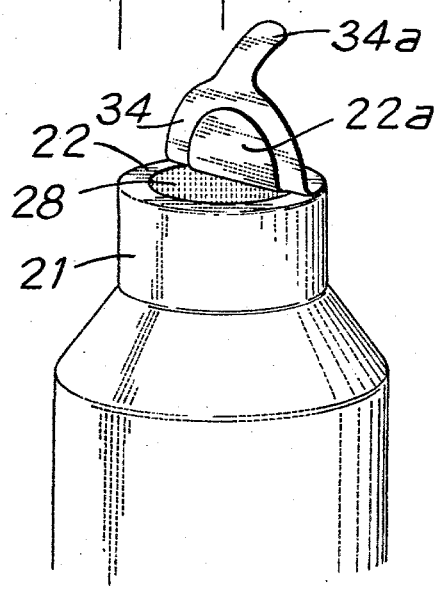
FIG. 21 is a view of the receptacle shown in FIG. 20 after the extraction opening has been disengaged.

Immediately after the point of attachment has been made between the strip and wall 22, or even virtually simultaneously, the punch 37 is moved towards the counter-punch 38, as far as a stop 37a, to cut the foil 34 out of the strip 31 on either side of or around this point of attachment. In the example illustrated, the covering foil 34 is in the form of a disc of diameter equal to or very slightly larger than that of the wall 22, provided with an appendix 34a intended subsequently to serve as gripping tongue when the receptacle is used (FIGS. 20 and 21).

The vertical displacements of the heating electrode 36 and of the punch 37 may be effected by the same drive means, the possibility of a relative vertical movement between these two members also being arranged, for example by connecting them in the vertical direction by an elastic element such as a spring 39.

By way of variant, the spot adhesion of the strip 31 against the wall 22 and the cutting out of the covering foil 34 may be effected successively at two different stations, a first where the bearing element 35 and the heating electrode 36 are provided and a second where the punch 37 and the counter-punch 38 are provided.

The receptacle 20 bearing the covering foil 34 is transferred, whilst still being supported by the support 32, to a station 40 where this foil 34 is definitively fixed (FIG. 16). This station comprises an upper vertically movable bearing element 41 adapted to be brought, inside the receptacle 20, into contact with the inner face of the wall 22, and a heating matrix 42 vertically movable under the receptacle opposite the bearing element 41. The heating matrix 42 has a shape which corresponds substantially to that of the end wall 22 so as to apply the foil 34 against the outer face of this wall supported on the inside by the cold bearing element 41. The bearing element is at least constituted by a ring 41a whose external diameter is almost equal to that of the wall 22 so as to ensure the adhesion of the foil 34 at least over the whole periphery of the outer face of the wall 22. The heating matrix 42 may be provided with a small vertical annular flange 42b to fold down the edge of the foil 34 when this latter has a diameter which is slightly larger than that of the wall 22. The matrix 42 is also advantageously provided with a vertical, non-heating projection 42a which serves to fold the tongue 34a down against the wall 11 without at least its end adhering thereto.

The bearing element 41 is completed by a central core 41b for reinforcing, in cooperation with the heating matrix 42, the spot connection effected by electrode 36. This enables the part 22a of the wall 22 to be firmly connected to the covering foil 34 which part, in the finished receptacle, is surrounded by a slot 26, and thus avoids this part of wall dropping in the case of the slot 26 being closed on itself.

This slot 26 is made at a station 43 to which the receptacle 20 is conveyed with the foil 34 hermetically fixed at least to the periphery of the wall 22. At this station 43 (FIG. 17) are provided a lower bearing element 44 vertically movable under a receptacle 20 in position at this station, and a heating tool 45 vertically movable opposite the bearing element 44, as far as the level of the wall 22, inside the receptacle. The bearing element 44 being applied against the outer face of the covering foil 34, the hot melting tool 45, for example in the form of an annular heating electrode, is applied and pressed against the inner face of the wall 22. By partly melting the thermo-plastic material, the tool 45 forms a slot 26, and is stopped by the covering foil 34 made of non-fusible material. A bead of rounded section is formed on each edge delimiting the slot 26. In the example shown, the slot is round and closed on itself.

By way of variant, the fixing of the covering foil 34 against the wall 22 and the production of the slot 26 by melting the thermoplastic material may be effected at the same station, the heating matrix 42 and the bearing element 44 being combined.

Figure 19:
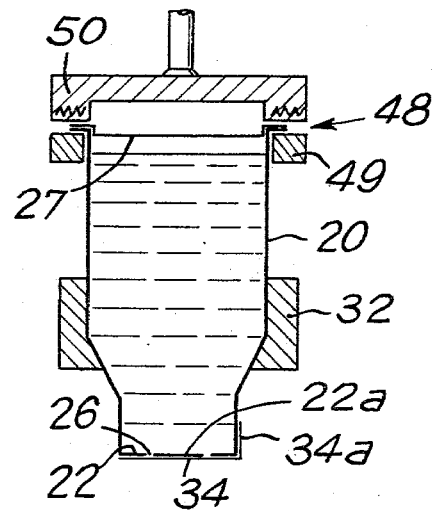

After the slot 26 has been made, the receptacle 20 is conveyed to a filling station 46 where this receptacle 20 is filled via one or more filling nozzles 47 through the filling opening 25 (FIG. 18). The receptacle 20 is then closed in a sealing station 48 where it is provided with a separate, sectioned or flat bottom 27, which is hermetically welded on the annular edge 24 of the receptacle 20 (FIG. 19). During filling and sealing of the receptacle 20, said latter is supported by the support 32. In the sealing station, a support ring 49 and a sealing electrode 50 which are vertically movable and adapted to tighten the edges of the receptacle 20 and the separate bottom 27 therebetween, serve to effect, in known manner, the hermetic closure of the receptacle 20 which is then placed in its normal position in which the covering foil 34 is at the top (FIG. 20).

FIG. 21 shows that the outer edge of the slot 26 constitutes at the same time the delimitation of the extraction opening 28 of the receptacle once the covering foil 34 has been removed.

What is claimed is:

1. A method of manufacturing, filling and closing a receptacle comprising:
   (a) forming in one piece a receptacle having a side wall and an end wall by deformation of a thermoplastic material in a mould, said end wall having an inner face and an outer face;
   (b) sealing a non-heat fusible covering foil or cap on at least a portion of the outer face of said end wall, said covering foil or cap being secured to said end wall by a layer of adhesive material on its face turned towards the end wall;
   (c) subsequently forming in said end wall at least one curved or polygonal slot having edges in the form of flanges of substantially rounded cross-section and at least partially closed on itself by partially melting the thermoplastic material from the face of said end wall and through the entire thickness of said end wall by applying on said inner face a heated electrode introduced into said receptacle through a filling opening opposite said end wall, at least a zone of said end wall surrounded by said slot and a part of said end wall surrounding by said slot being hermetically fast with said covering foil or cap;
   (d) filling said receptacle through said filling opening opposite said end wall provided with said at least one slot; and
   (e) hermetically closing and filling opening by a separate bottom, whereby an extraction opening can be made through said end wall by removing said covering foil and pulling thereby said part of said end wall surrounded by said at least one slot.

2. A method as claimed in claim 1, wherein said covering foil or cap is deposited on the mould bottom prior the forming of the receptacle in said mould, and said sealing of the overing foil or cap on the end wall of the receptacle is performed during forming of said thermoplastic material in said mould.

3. A method as claimed in claim 1, comprising:
   bringing a section of a strip coated with a layer of adhesive opposite the outer face of said end wall after forming of said side and end walls of the receptacle;
   making at least one point of attachment between said strip and the outer face of said end wall;
   cutting out said covering foil from said strip; and
   sealing said covering foil on said end wall.

4. A method as claimed in claim 3, wherein the attaching of said strip to said end wall and the cutting of said covering foil from said strip are carried out at a same station.

5. A method as claimed in claim 3, wherein the attaching of said strip to said end wall and the cutting of said covering foil from said strip are carried out successively at two different stations.

6. A method as claimed in claim 3, wherein the sealing of said covering foil on said end wall and the forming of said at least one slot are carried out at a same station.

7. A method as claimed in claim 3, wherein the sealing of said covering foil on said end wall and the forming of said at least one slot are carried out successively at two different stations.

8. A method as claimed in claim 1, comprising providing a covering foil having a gripping tab not provided with an adhesive layer and sealing said covering foil on said end wall with said tab folded down against said side wall.

9. The method of claim 1, wherein said covering foil or cap is heat conductive.

10. The method of claim 1, wherein said covering foil or cap stops said electrode after it has formed said slot.

11. A method of manufacturing, filling and closing a receptacle comprising:
   (a) providing a receptacle having a side wall, an end wall integral with said side wall and made of thermoplastic material, said end wall having an inner face and an outer face and non-heat fusible cover means attached to at least a portion of the outer face of said end wall;
   (b) subsequently forming at least one curved or polygonal slot in said end wall by partially melting the thermoplastic material of said end wall through the entire thickness thereof, by applying on said inner face a heated electrode introduced into said receptacle through a filling opening opposite said end wall, said slot having edges in the form of flanges of substantially rounded section, at least a zone of said end wall surrounded by said slot and a part of said end wall surrounding said slot being hermetically fast with said cover means;
(c) filling said receptacle through said filling opening opposite said end wall provided with said at least one slot; and
(d) hermetically closing said filling opening.

12. The method of claim 11, wherein said covering foil or cap is heat conductive.

13. The method of claim 11, wherein said covering foil or cap stops said electrode after it has formed said slot.

* * * * *